Figure 1:
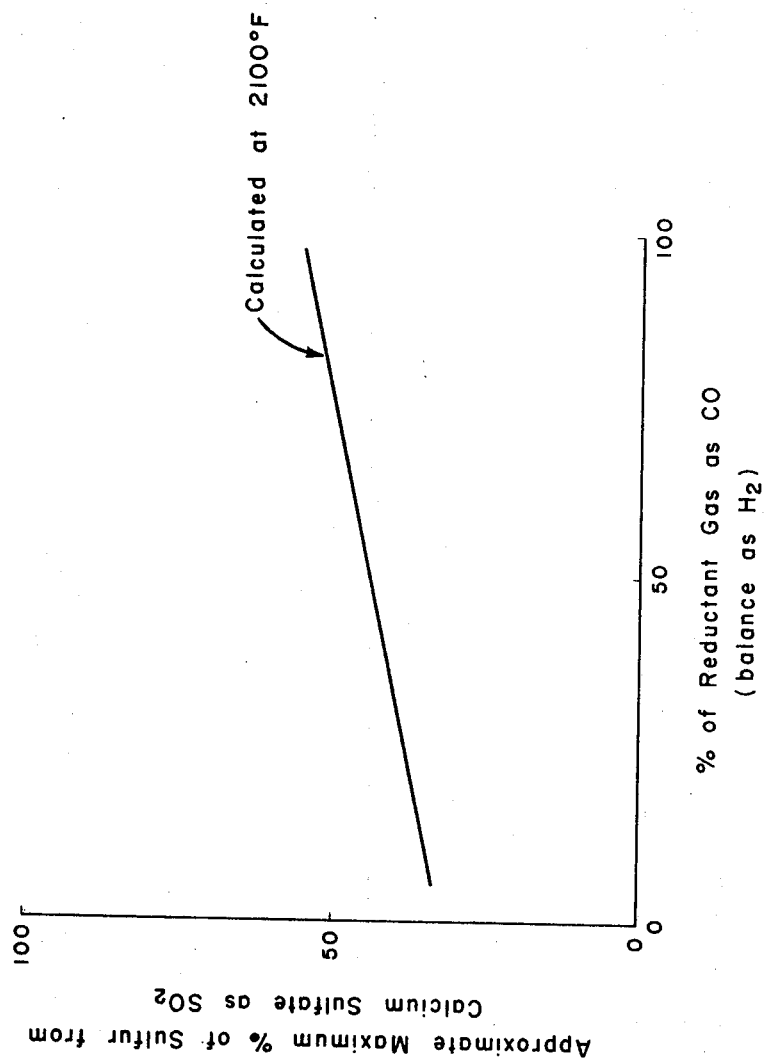

United States Patent

[11] 3,607,068

[72] Inventors: Roy Edwin Campbell; Edwin Eddie Fisher, both of Midland, Mich.
[21] Appl. No.: 746,643
[22] Filed: July 22, 1968
[45] Patented: Sept. 21, 1971
[73] Assignee: Elcor Chemical Corporation, Midland, Tex.

[54] SULFUR RECOVERY PROCESS
9 Claims, 3 Drawing Figs.

[52] U.S. Cl. ............................................. 23/224, 23/177
[51] Int. Cl. ........................................... C01b 17/44, C01b 17/50
[50] Field of Search .............................. 23/224–226, 181, 177, 137

[56] References Cited

UNITED STATES PATENTS

| | | | |
|---|---|---|---|
| 3,402,998 | 9/1968 | Squires | 23/181 |
| 3,401,010 | 9/1968 | Guerrieri | 23/177 X |
| 2,740,691 | 4/1956 | Burwell | 23/181 |

FOREIGN PATENTS

| | | | |
|---|---|---|---|
| 514,993 | 11/1939 | England | 23/177 |
| 643,479 | 9/1950 | England | 23/177 |

OTHER REFERENCES

Sisler et al., General Chemistry, pp. 34–35 (Macmillan 1949) Perry, Chem. Engrs. Handbook, sect. 9, pp. 58–60, 4th ed. (McGraw-Hill 1963)

Primary Examiner—Oscar R. Vertiz
Assistant Examiner—Charles B. Rodman
Attorney—Brumbaugh, Graves, Donohue & Raymond ABSTRACT: A method of recovering sulfur from a metal sulfate whereby a substantial part of the sulfur content is recovered as sulfur dioxide and the balance as hydrogen sulfide. The sulfate is contacted with reducing gases at high temperatures to produce a metal sulfide and a metal oxide under conditions favoring an off-gas stream rich in sulfur dioxide; the metal sulfide may subsequently be converted to hydrogen sulfide and sulfur and sulfur compounds are recovered.

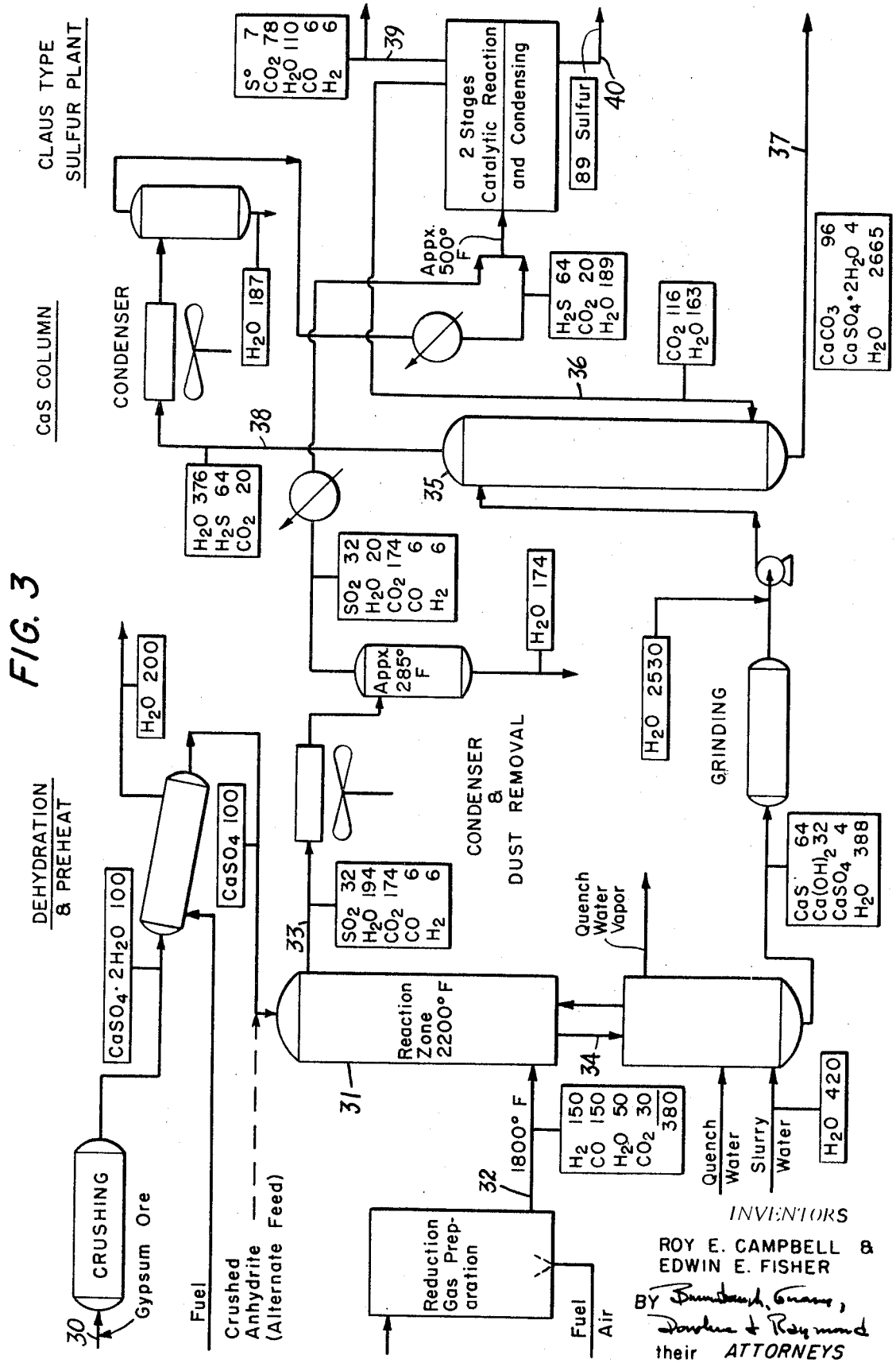

SULFUR RECOVERY PROCESS

This invention relates to a process for recovering sulfur from a metal sulfate, and particularly, to a procedure by which a metal sulfate is reduced to provide separate streams of sulfur dioxide and hydrogen sulfide.

Sulfur in its various forms is a very important and widely used chemical. Such processes as synthetic fibers, rubber, plastics, paint, and oil refining depend heavily upon the availability of large amounts of sulfur, or sulfuric acid, at a relatively low cost. Approximately 26 million long tons of sulfur were consumed in 1967 in the Free World and consumption has been growing at the rate of seven to eight percent annually during the past five years.

World sulfur reserves from all sources are ample for the foreseeable future, but the present primary sources are limited in reserves and these sources must be supplemented by other sources for future needs. Primary sources include those which now are producing most of the sulfur, such as Frasch mining, recovery from sour gas, and mineral production. Vast reserves of sulfur are contained in secondary sources such as sulfide ores, oil, oil shales and tar sands, coal, gypsum, and anhydrite. Unfortunately, the processing technology has not been developed to allow a significant amount of most of these secondary sources to supply sulfur at costs as low as the primary sources.

As competitive sources of sulfur, gypsum and anhydrite have been the subjects of study for many years, but as yet there is no facility in this country producing elemental sulfur from this source. There are a few plants recovering sulfur in the form of sulfuric acid in other countries, but apparently the economics of these operations have not been favorable for this country.

One such process is employed in Europe to produce sulfuric acid from anhydrite. In accordance with this process, a mixture of anhydrite, coke, and shale is heated to a sintering temperature in a rotary kiln. Sulfur dioxide is driven off and recovered for conversion into sulfuric acid. The residue or clinker is used in making Portland cement.

Elemental sulfur may be produced from gypsum by following the process of French Pat. No. 375,469 published July 10, 1907. In accordance with the French Pat., calcium sulfate is first treated with reducing gases to form calcium sulfide, carbon dioxide and water in accordance with the following equations:

$$CaSO_4 + 4H_2 \rightarrow CaS + 4H_2O$$
$$CaSO_4 + 4CO \rightarrow CaS + 4CO_2$$
$$CaSO_4 + CH_4 \rightarrow CaS + CO_2 + 2H_2O$$

The calcium sulfide is then ground and combined with water to form a slurry. Carbon dioxide is collected from the first reaction, and then contacted with the calcium sulfide slurry to cause a reaction in accordance with the following equation:

$$CaS + CO_2 + H_2O \rightarrow H_2S + CaCO_3$$

The stream of hydrogen sulfide obtained as a product of the reaction is converted to elemental sulfur in a Claus-type sulfur plant, and the $CaCO_3$ is produced as a byproduct.

The process of the French patent requires 4.0 moles of reductant gases $H_2$ and CO in the ideal case to produce 1.0 mole of elemental sulfur. The following reactions indicate this relationship:

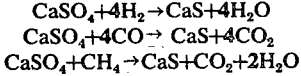
} 4 moles of either reducing gas are required to form one mole of CaS

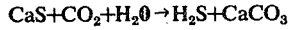
} one mole of CaS forms one mole of $H_2S$, and then one mole of elemental sulfur When hydrogen and carbon monoxide are used in the process of the French patent, the reducing reactions are exothermic. The heat of reaction can be used in dehydrating and preheating the gypsum or anhydrite in a countercurrent reactor.

Other reactions can occur during the reduction reactions in which the same materials react together to form different products. Both hydrogen and carbon monoxide, for example, can react with calcium sulfate to form calcium oxide and sulfur dioxide:

$$CaSO_4 + H_2 \rightarrow CaO + H_2O + SO_2$$
$$CaSO_4 + CO \rightarrow CaO + CO_2 + SO_2$$

If these reactions can be made to occur, only one mole of reductant is required per mole of sulfur. This is one-fourth as much as is required when the sulfate is reduced to the sulfide. However, the required reactions for this to occur proceed at commercial rates only at temperatures above about 2,000° F., and the reactions are highly endothermic. Thus, a commercial process would require the transfer of substantial amounts of heat into the reacting materials, and the transfer must take place at temperatures above 2,000° F. Supplying large quantities of heat at such a high temperature would require very expensive materials and an economic use of the large quantities of the resulting waste heat. These two factors have prevented any significant commercial utilization of these reactions.

We have discovered that the required heat of reaction for the above endothermic reactions can be supplied by the exothermic heat of reaction resulting from the reduction of a portion of the calcium sulfate to calcium sulfide. This internal generation of the required heat is highly efficient, since there is essentially no heat lost, except for the minor heat loss through the wall of a commercial reactor. Supplying the heat by internal generation also has the advantage of allowing a very simple reactor vessel construction using mild steel with an internal lining of commonly available refractory material.

In addition, we have found that an improved process for producing sulfur from a metal sulfate is provided by reducing the sulfate under conditions which produce substantial quantities of sulfur dioxide in a rich stream, as well as metal sulfide, and by thereafter contacting the sulfide with carbon dioxide in the presence of water to produce hydrogen sulfide. The sulfur dioxide may be separately collected; if desired, it may be used to manufacture sulfuric acid. The separate stream of hydrogen sulfide may be converted to elemental sulfur in a conventional manner, as by a Claus-type reaction. Alternatively and in accordance with a preferred embodiment of the invention, the $SO_2$ and $H_2S$ may be produced in stoichometric amounts and thereafter combined to provide elemental sulfur in a Claus-type reaction.

The process described herein is of immediate commercial value because it will permit economic recovery of sulfur from gypsum and anhydrite in the form of elemental sulfur and sulfuric acid, or in the forms of calcium sulfide, hydrogen sulfide, and sulfur dioxide. It has flexibility in that the range of products can be varied according to local economic situations without sacrificing the unique capability to recover sulfur at a cost lower than current technology and at a cost which is competitive in today's market.

Gypsum and anhydrite are interchangeable for the processing described since the chemical reactions are identical. Differences in reaction rates and the dehydration heat requirements for these raw materials are so minor that proper design and operation will allow both materials to be processed in the same equipment to make the same end products.

Hydrogen and carbon monoxide are commonly used reducing gases; formulae describing their reactions in the process of this invention are given in the following table to illustrate the concept of balancing the heats of reaction:

TABLE I

| Reactions | Approximate heat [1] |
|---|---|
| $4H_2 + CaSO_4 \rightarrow CaS + 4H_2O$ | −23 exothermic. |
| $4 CO + CaSO_4 \rightarrow CaS + 4CO_2$ | −51 exothermic. |
| $H_2 + CaSO_4 \rightarrow CaO + SO_2 + H_2O$ | +48 endothermic. |
| $CO + CaSO_4 \rightarrow CaO + SO_2 + CO_2$ | +40 endothermic. |

[1] Released or required per mole of calcium sulfate calculated at 2,100° F., expressed as kcal./g. mole.

Small amounts of sulfur also emerge from the reaction in such other forms as hydrogen sulfide, carbonyl sulfide, and elemental sulfur, depending upon the specific conditions maintained in the reactor.

Figure 2:
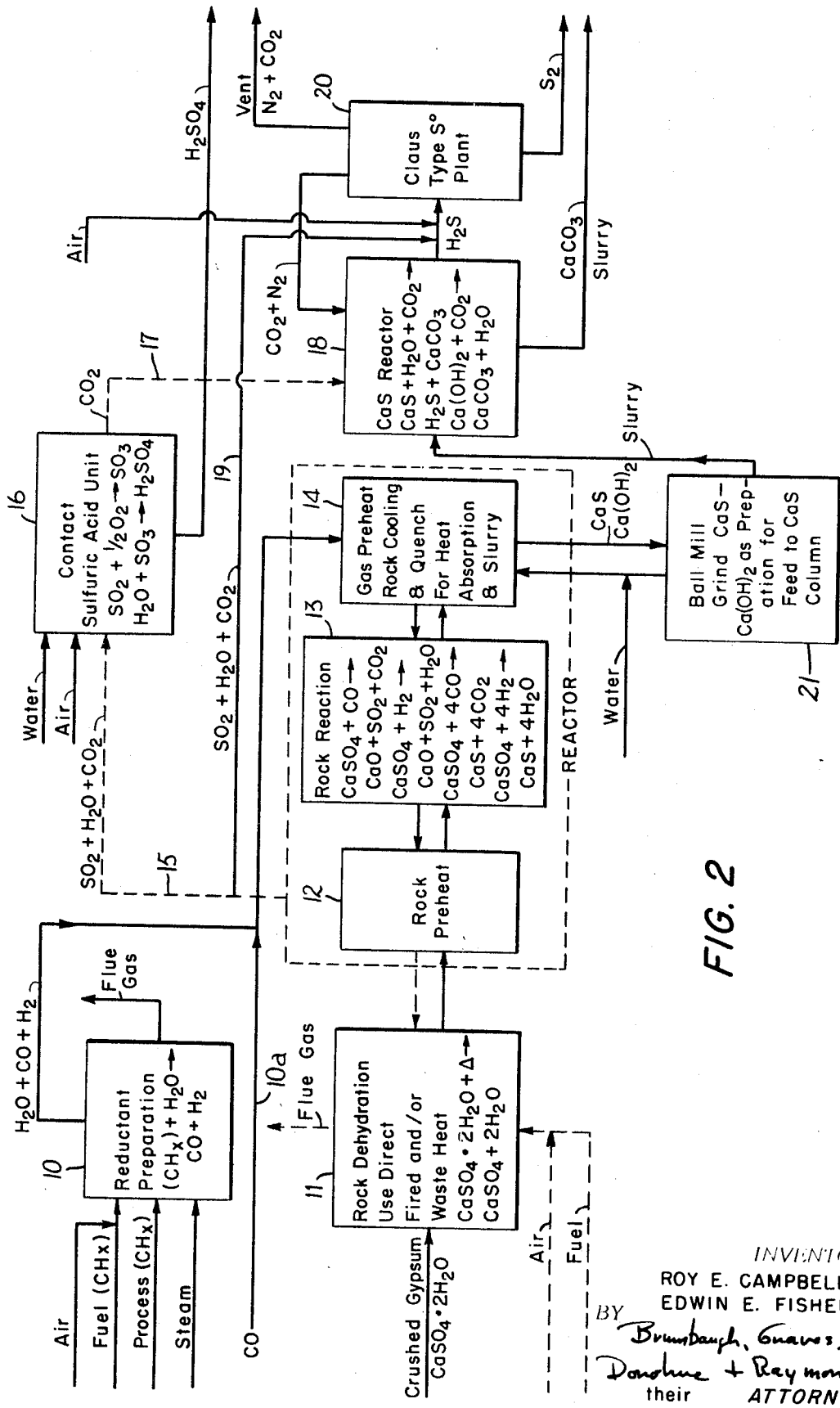

For a further understanding of the invention, reference is made to the accompanying drawings, wherein:

FIG. 1 is a chart illustrating one variable condition of the process of this invention, FIG. 2 is a flow diagram of the process of the present invention, and FIG. 3 is another flow diagram of one embodiment of the present invention.

FIG. 1 of the drawings illustrates the effect of balancing the endothermic and exothermic heats of reactions as the ratio of hydrogen to carbon monoxide is varied. This curve is calculated for an average reaction zone temperature of 2,100° F., neglecting heat losses, variation of temperature throughout a practical reaction zone with a finite depth, minor side reactions, incomplete conversion of the gas and solid, etc. FIG. 1 represents the maximum percentage of sulfur which it is possible to produce as sulfur dioxide under ideal conditions and is based on commonly accepted thermodynamic data from the chemical literature.

By following hydrogen through the reactions outlined in Table I, it will be noted that the heat released by hydrogen in the reaction forming CaS is considerably less than the heat required by hydrogen in forming $SO_2$. Carbon monoxide, on the other hand, has a more favorable heat balance between the two reactions. Carbon monoxide is thus a more desirable reductant than hydrogen in processes where it is desirable to produce the maximum amount of sulfur dioxide. Thus, where desired for a particular installation, the performance may be improved by adjusting the composition of the reducing gas. Such adjustment can be effected for instance, by introducing additional carbon dioxide which will react at elevated temperatures with hydrogen to form carbon monoxide and water vapor. This reaction is endothermic and heat must be supplied to effect the conversion to carbon monoxide and increase the carbon monoxide to hydrogen ratio. This adjustment of concentration may be performed in a separate processing step between the reduction gas preparation and the reactor. The technology of preparing various reducing gas streams by such means as partial oxidation, steam reforming etc. is well known.

Metal sulfates which may be treated according to the process of the present invention include aluminum sulfate, barium sulfate, cadmium sulfate, calcium sulfate, cerium sulfate, chromium sulfate, cobalt sulfate, potassium sulfate, magnesium sulfate, lithium sulfate, sodium sulfate, nickel sulfate, lead sulfate, strontium sulfate, thorium sulfate, titanium sulfate, vanadium sulfate, and zinc sulfate.

The invention is particularly useful for reducing alkaline earth metal sulfates such as calcium sulfate, magnesium sulfate, barium sulfate, and strontium sulfate. Calcium sulfate, in the form of gypsum or anhydrite, is of the most immediate commercial interest. However, it is recognized that the process disclosed herein, with suitable variations in conditions, is applicable to the other metal sulfates listed above.

Another means of favoring the additional reactions that increase the amount of sulfur dioxide produced while maintaining other conditions of the reduction reaction constant is by supplying additional heat to the reaction bed. Particulate inert solids heated to temperatures in excess of that existing in the reaction bed may be fed to the bed continuously with the sulfate and reducing gases. Examples of suitable solids are ceramic materials which remain solid at the high temperatures involved. Another means of introducing heat into the reaction zone is through the use of electric heaters located in the reaction bed. Still another procedure is the recycling of preheated gases which transfer their sensible heat to the reaction bed.

A still further alternative means is the addition or recycling of a gas which will react in the reaction bed or with the product rock leaving the reactor and liberate its exothermic heat of reaction. The following equations give illustrative reactions:

| | Approximate heat [1] |
|---|---|
| $CaO+H_2S \rightarrow CaS+H_2O$ | −17 exothermic. |
| $CaO+CO_2 \rightarrow CaCO_3$ | −38 exothermic. |

[1] Released or required per mole of calcium calculated at 2,100° F., kcal./g. mole.

Another means of increasing the availability of the needed endothermic heat of reaction is to add air or oxygen in small amounts. Among the resulting reactions are the following:

| | Approximate heat [1] |
|---|---|
| $CaS+1\text{-}½\,O_2 \rightarrow CaO+SO_2$ | −108 exothermic. |
| $CaS+2O_2 \rightarrow CaSO_4$ | −217 exothermic. |

[1] Released or required per mole of calcium calculated at 2,100° F., kcal./g. mole.

These reactions release large amounts of exothermic heat of reaction within the reaction bed.

In accordance with one preferred embodiment of the process of this invention, the process conditions and concentrations of the reducing gas are adjusted to obtain exactly one-third of the sulfur in the form of sulfur dioxide. The remaining two-thirds of the sulfur in the calcium sulfate is then converted to hydrogen sulfide, for example, as described in French Pat. No. 375,469. The sulfur dioxide gas stream is then mixed with the hydrogen sulfide gas stream and converted to elemental sulfur in a Claus-type sulfur plant. The net result is a savings of approximately 25 percent of the reductant gas usage resulting from the process of converting all the sulfur to hydrogen sulfide as in French Pat. 375,469. Since the cost of the reductants is a major cost in the production of sulfur, this provides a substantial savings.

Where the composition of the reducing gas permits, we prefer to produce the gases in a hydrogen sulfide-to-sulfur dioxide ratio of two to one for the most efficient production of elemental sulfur. If the concentration of the reducing gas would not permit the desired ratio of hydrogen sulfide to carbon monoxide, the cost of adjusting the reducing gas concentration would, of course, be compared to the increased use of reductants in order to achieve this ratio for sulfur recovery. If the ratio is lower than this, the excess sulfur in the form of sulfur dioxide can be recovered for other uses, such as production of sulfuric acid. The operating conditions of the reactor can be varied to change the percentage of sulfur produced as sulfur dioxide. For example, lowering the temperature of the solid or gas feed streams will lower the amount of sulfur dioxide produced. If the ratio is higher than two to one, air or oxygen is mixed and reacted with the excess hydrogen sulfide present before it enters the sulfur plant. This oxygen-containing stream is controlled to adjust the ratio to two to one. Any sulfur recovered as sulfur dioxide represents a savings in the use of reductant gases, even when the amount is more or less than one-third of the total sulfur.

A second preferred method of using the process of this invention is to utilize the most readily available source of reducing gases. In some sections of the country, such a source is from the steam reforming of hydrocarbons, especially the steam reforming of natural gas. A stream of reducing gas from the reforming of natural gas is capable of producing sulfur dioxide in quantities approaching one-third of the total sulfur with proper gas quality and process design. This preferred system has the advantages of proven processes for the reduction gas preparation, convenience, and having sufficient carbon in the reducing gas to furnish most or all of the carbon dioxide necessary for converting the calcium sulfide to hydrogen sulfide. The ratio of carbon to hydrogen in the hydrocarbon is a factor in the economics. A minimum amount of carbon is required to generate the necessary carbon dioxide in the reactor bed for the subsequent release of hydrogen sulfide from the calcium sulfide. If there is not sufficient carbon dioxide for this purpose, an outside source would be required, such as from flue gases:

$$CaS+H_2O+CO_2 \rightarrow CaCO_3+H_2S$$

The process of the present invention will be described with reference to the flow diagram set forth in FIG. 2. A reducing gas mixture is prepared in any of a number of conventional prior art techniques. A preferred reducing gas mixture is prepared by subjecting natural gas to a reforming process. In a still further preferred embodiment, the reformed natural gas is enriched by the addition of carbon monoxide to provide a stream of reducing gases containing approximately equal volumes of carbon monoxide, and hydrogen, with carbon dioxide and water being present in equilibrium amounts and with trace quantities of nitrogen. The exact amount of carbon monoxide required will depend upon the exact operating conditions and design of equipment, but is controlled to maintain a hydrogen sulfide-to-sulfur dioxide ratio of exactly two-to-one. The steam reforming step is shown in the attached drawing as Block 10. Supplemental amounts of carbon monoxide are provided through line 10a as required.

Gypsum ore, preferably crushed and screened to a particle size range of about ¼ to one and ½ inches in maximum dimensions, is dehydrated as shown at block 11 in FIG. 2. Anhydrite, which is interchangeable, may be substituted for the gypsum, in which case a dehydration step is unnecessary. Following the dehydration step, the rock is introduced into a reaction vessel, preferably a shaft furnace, which is represented in the diagram of FIG. 2 by Blocks 12, 13 and 14. Block 12 represents the top section of the shaft furnace where the sulfate is preheated utilizing the hot gases produced at a later stage in the process. As the rock slowly descends through the furnace, it is gradually heated from its temperature at the time of introduction to the temperature of the reaction zone. This is accomplished by the exchange of heat from the hot stream of gaseous products flowing up through the descending rock.

Block 13 represents the reaction zone of the reactor. The temperature at this stage may range from 2,000° F. to 2,500° F. and the calcium sulfate attains this temperature during its downward passage through the reactor. A series of reactions take place in the reaction zone as indicated in Block 13. The reduction of the calcium sulfate to calcium sulfide by reaction with carbon monoxide and hydrogen are shown in the lower two equations. The first two equations represent the reactions which produce sulfur dioxide. The resulting calcium sulfide and calcium oxide continue their passage downwardly through the column and are cooled and quenched as shown in block 14. The sulfur dioxide and carbon dioxide as well as any water vapor produced during the reaction pass upwardly through the freshly introduced calcium sulfate and perform a preheating function and are thereafter recovered through Line 15.

The sulfur dioxide stream may then be used to produce sulfuric acid in accordance with the equations shown in Block 16. In that event, the carbon dioxide is recovered and carried through Line 17 to the calcium sulfide reactor represented by Block 18. Optionally, the sulfur dioxide stream is carried directly by Line 19 to be combined with the hydrogen sulfide produced by reactor 18, to produce elemental sulfur in a unit represented by Block 20.

The calcium oxide, which is converted to calcium hydroxide during the quenching step, and the calcium sulfide from the cooling step at Block 14, are carried to a ball mill and ground in the step represented by Block 21. This mixture is fed to a calcium sulfide reactor represented by Block 18, where the calcium sulfide is converted to hydrogen sulfide. The calcium hydroxide is converted to calcium carbonate during this step. Essentially, all calcium is removed as calcium carbonate as the final product of the reaction. Minor processing steps such as dust removal and heat exchange are not shown on FIG. 2 for simplicity.

If all sulfur dioxide is removed for conversion to products other than elemental sulfur, the sulfur recovery plant, Block 20, operates in a conventional manner. A controlled amount of air would be reacted with the hydrogen sulfide to convert one-third to sulfur dioxide.

EXAMPLE 1

FIG. 3 is a flow diagram describing an example of the reduction of gypsum according to this invention. In accordance with this example, about one-third of the sulfate sulfur is converted to $SO_2$ and the balance to $H_2S$. The numerals which appear in boxes in FIG. 3 represent a material balance and give the amount of the indicated reactant at that point in the process in pound moles, for each 100 pound moles of gypsum fed to the process.

Crushed gypsum ore, having particle sizes within the approximately range of ¼ inch to 1-½ inch, is introduced as steam 30. The gypsum is then completely dehydrated by heating according to the following overall formula:

$$CaSO_4 \cdot 2H_2O \rightarrow CaSO_4 + 2H_2O$$

After dehydration, the dehydrated calcium sulfate is fed into the top of the shaft furnace reactor 31. The reactor is one which can process approximately 7,500 tons per day of gypsum with a feed size range of +½ inch to 1-½ inch, and has a reaction bed which is approximately 20 feet ID by 60 feet high. The reactor is operated at 100 p.s.i.g. pressure, with a pressure drop of 10 to 15 p.s.i. through the reactor bed.

The $CaSO_4$ is fed into the top of the shaft furnace 31, and is preheated as it moves downward by gravity through the upflow of reducing gases.

A reducing gas containing approximately equal volumes of CO and $H_2$, as well as an equilibrium amount of $CO_2$ and $H_2O$ is prepared and is introduced into the bottom of the reactor as stream 32 at a temperature of about 1,800° F.

Assuming approximately 96 percent conversion of the $CaSO_4$ and the reducing gases, approximately 150 pound moles of $H_2$ and 150 pounds moles of CO are required for each 100 pound moles of $CaSO_4$. The $CaSO_4$ is reduced in the reaction zone according to the following equations.

$$CaSO_4+H_2 \rightarrow CaO+SO_2+H_2O$$
$$CaSO_4+CO \rightarrow CaO+SO_2+CO_2$$
$$CaSO_4+4h_2 \rightarrow CaS+4H_2O$$
$$CaSO_4+4CO \rightarrow CaS+4CO_2$$

The maximum temperature reached in the reaction zone is approximately 2,200° F.

Approximately one-third of the sulfur in the $CaSO_4$ feed leaves with the gas stream 33 in the form of $SO_2$, while approximately two-thirds of the sulfur emerges in the rock product as CaS, along with a small amount of unconverted $CaSO_4$. The calcium sulfate dust particles produced during downward passage of the rock are removed from stream 33 downstream of the reactor.

The reactor rock product, stream 34, is quenched in water, ground to a fine slurry and carried to a gas-liquid reactor 35 where it is reacted with $CO_2$ supplied by gas stream 36 recovered from a later stage in the process.

Reactor 35 is a tall, liquid-filled column in which the $CO_2$ containing gas stream 36 is bubbled up through the descending CaS slurry. Sufficient carbon is supplied to the process to cause all converted calcium to leave as calcium carbonate. If there is a carbon deficiency, it may be supplied from an outside source. For example, flue gases containing carbon dioxide may be compressed and added to gas stream 36 to balance the requirements. No deficiency exists in the example being discussed. The overall reaction in the CaS reactor is exothermic. The reaction rate and temperature attained is dependent on the percent solids in the slurry; a slurry concentration of about 15 percent is used. The CaO, which has reacted with water during quenching and grinding to become $Ca(OH)_2$ in the slurry, and the CaS, are converted to $H_2S$ and $CaCO_3$:

$$CaS+CO_2+H_2O \rightarrow CaCO_3+H_2S$$
$$Ca(OH)_2+CO_2 \rightarrow CaCO_3+H_2O$$

The $CaCO_3$-water slurry leaves the bottom of the reactor vessel 35 as stream 37 for disposal, water reclaiming or utilization in additional processing. Because the reactor is operated with a small excess of $CO_2$ in the gas stream 36 over that required for a complete conversion of the CaS to $H_2S$, stream 37 contains only small amounts of unreacted CaS.

The gas leaving the top of the reactor 35, stream 38, contains essentially all of the sulfur which entered as CaS, in the form of $H_2S$ gas. Excess $CO_2$, recycled inert gases, and $H_2O$ vapor are also present. The gas stream 33 leaving the top of the shaft furnace reactor 31, contains primarily $CO_2$, $SO_2$, and $H_2O$, and small amounts of unconverted $H_2$, and small amounts of unconverted CO. The ratio of sulfur produced as $H_2S$ to sulfur produced as $SO_2$ is controlled at about 2:1. The gas stream 33, after dust collection and dehydration, is mixed with gas stream 38 and reacted according to the following:

$2H_2S + SO_2 \rightarrow 3S + 2H_2O$ This reaction is accomplished in the same manner as in a conventional Claus-process sulfur plant, which is well known in the industry. The gas stream is passed down through a bed of catalyst, such as bauxite, at temperatures above the sulfur dew point. Sulfur is condensed downstream of the catalyst bed by cooling the gas. The gas stream is then reheated and passed through a second catalyst bed and a second sulfur condenser. The resulting gas stream 39 contains only a minor amount of unrecovered sulfur, but a large amount of carbon dioxide and water vapor. A portion of this stream is returned to react with calcium sulfide in column 35 through stream 36. Excess $CO_2$ and inert gases are vented as stream 39 to the atmosphere. The small amounts of unrecovered sulfur in all forms is shown as elemental sulfur, and the hydrogen and carbon monoxide are shown as remaining unchanged for simplicity in the material balance on FIG. 3. All these components are actually in various equilibrium forms. High purity molten sulfur, stream 40, is drained to storage.

We claim:

1. A process for the gaseous reduction of calcium sulfate comprising the step of heating the sulfate to a temperature within the approximate range of 2,000° F. to 2,500° F. while contacting the sulfate with reducing gases containing hydrogen and carbon monoxide to concurrently produce calcium sulfide, calcium oxide, and substantial quantities of sulfur dioxide.

2. A process for the gaseous reduction of calcium sulfate comprising the steps of heating the sulfate to reaction temperature by transferring heat from hot gaseous products of a subsequent reduction reaction of the sulfate with reducing gases, before the sulfate enters the reaction zone, reacting the sulfate with reducing gases containing hydrogen and carbon monoxide at a temperature with the approximate range of 2,000° F. to 2,500° F. to produce calcium sulfide, calcium oxide, and substantial quantities of sulfur dioxide, and recovering the products.

3. A process for the gaseous reduction of calcium sulfate comprising the steps of heating the sulfate to reaction temperature by transferring heat from hot gaseous products of a subsequent reaction of the sulfate with reducing gases before the sulfate enters the reaction zone, reacting the sulfate with reducing gases containing hydrogen and carbon monoxide at a temperature with the approximate range of 2,000° F. to 2,5000° F. to produce calcium sulfide, calcium oxide, and substantial quantities of sulfur dioxide. thereby converting from about five percent to about 95 percent of the sulfur to sulfur dioxide, and recovering the products.

4. A process for the gaseous reduction of calcium sulfate comprising the steps of heating the sulfate to reaction temperature by transferring heat from hot gaseous products of a subsequent reaction of the sulfate with reducing gases before the sulfate enters the reaction zone, the sulfate is reacted at a temperature within the approximate range of a 2,000° F. to 2,500° F. with reducing gases containing hydrogen and carbon monoxide in a molar ratio which converts approximately one-third of the sulfate sulfur to sulfur dioxide, and concurrently converting the remaining two-thirds of the sulfate to calcium sulfide.

5. Process of claim 4, wherein the calcium sulfide is reacted with carbon dioxide and water to form hydrogen sulfide, and the sulfur dioxide and hydrogen sulfide are combined to form elemental sulfur.

6. A process for recovering elemental sulfur from gypsum which comprises
   a. crushing and screening the gypsum to a uniform particle size,
   b. dehydrating the gypsum to drive off its water of crystallization,
   c. heating the calcium sulfate up to reaction temperatures by exchanging heat with the hot gaseous products of the subsequent reaction, occurring in step (d)
   d. contacting the calcium sulfate with a stream of reducing gases comprising hydrogen and carbon monoxide in approximately equal quantities at a temperature within the approximate range of 2,000° F. to 2,5000° F. to convert one-third of the sulfur in the metal sulfate to sulfur dioxide,
   e. collecting the sulfur dioxide produced during the reduction reaction.
   f. converting the calcium sulfide to hydrogen sulfide, and
   g. combining the sulfur dioxide and hydrogen sulfide streams to produce elemental sulfur.

7. The process of claim 6, wherein less than one-third of the sulfur contained in the metal sulfate is converted to sulfur dioxide and a portion of the hydrogen sulfide is converted to sulfur dioxide to control the ratio of hydrogen sulfide-to-sulfur dioxide ratio at 2-to-1 for the production of elemental sulfur.

8. The process of claim 4, wherein the calcium sulfide is reacted with carbon dioxide and water to form hydrogen sulfide, and wherein all or part of the sulfur dioxide is converted to sulfuric acid and the hydrogen sulfide is converted to elemental sulfur or sulfuric acid.

9. The process of claim 8, wherein carbon dioxide from flue gases or an outside source is added as needed to provide sufficient carbon dioxide to convert all of the calcium to calcium carbonate.

PO-1050
(5/69)

UNITED STATES PATENT OFFICE
CERTIFICATE OF CORRECTION

Patent No. 3,607,068      Dated September 21, 1971

Inventor(s) Roy Edwin Campbell and Edwin Eddie Fisher

It is certified that error appears in the above-identified patent and that said Letters Patent are hereby corrected as shown below:

First page, address of the inventors, "Midland, Mich." should be --Midland, Tex.--;

Column 5, line 25, "block" should be --Block--;
line 49, "block" should be --Block--;
Column 6, lines 15 and 16, "approximately" should be --approximate--;
line 17, "steam" should be --stream--;
line 23, "+1/2 inch" should be --+1/4 inch--;
line 36, "pounds" should be --pound--;
line 41, "4h₂" should be --4H₂--;
line 73, "Ca(oH)₂2" should be --Ca(OH)₂--;
Column 7, line 15, after "SO₂" insert -- → --;
line 49, "with" should be --within--;
Column 8, line 3, "with" should be --within--;
line 4, "2,5000°F." should be --2,500°F.--;
line 6, after "sulfur" (first occurrence) insert --in the sulfate--;
line 13, after "of" delete "a"; and
line 35, "2,5000°F." should be --2,500°F.--.

Signed and sealed this 18th day of April 1972.

(SEAL)
Attest:

EDWARD M. FLETCHER, JR.
Attesting Officer

ROBERT GOTTSCHALK
Commissioner of Patents